United States Patent
Norton, Jr.

[11] 3,841,448
[45] Oct. 15, 1974

[54] REINFORCED BRAKE DRUM

[75] Inventor: Roy C. Norton, Jr., Birmingham, Mich.

[73] Assignee: The Budd Company, Philadelphia, Pa.

[22] Filed: June 14, 1973

[21] Appl. No.: 370,100

[52] U.S. Cl............................................. 188/218 R
[51] Int. Cl............................................. F16d 65/10
[58] Field of Search..................... 188/218 R, 218 A

[56] References Cited
UNITED STATES PATENTS

| | | | |
|---|---|---|---|
| 1,875,114 | 8/1932 | Norton | 188/218 R |
| 1,900,844 | 3/1933 | Norton | 188/218 R |
| 1,946,102 | 2/1934 | Norton | 188/218 R |
| 2,111,709 | 3/1938 | Van Halteren | 188/218 R |
| 2,398,501 | 4/1946 | Le Jeune | 188/218 R |
| 2,558,297 | 6/1951 | Horn | 188/218 R |
| 2,897,925 | 8/1959 | Strohm | 188/218 R |

FOREIGN PATENTS OR APPLICATIONS

| | | | |
|---|---|---|---|
| 123,707 | 3/1931 | Germany | 188/218 R |

Primary Examiner—Trygve M. Blix
Assistant Examiner—Edward R. Kazenske

[57] ABSTRACT

Brake drum for motor vehicle wheels having an encompassing band of high tensile metal, such as steel, embedded in and bonded to the cast metal forming the main body of the drum to minimize circumferential end expansion or bell-mounting of the drum, to reduce cracking of the cast metal, and to retain the drum in serviceable condition if cracks should develop.

3 Claims, 2 Drawing Figures

PATENTED OCT 15 1974 3,841,448

REINFORCED BRAKE DRUM

BACKGROUND OF INVENTION

Heretofore there have been many proposals for strengthening the open end of a brake drum, usually by increasing the amount of cast metal adjacent the end, as by circumferential ribs and the like. This does not substantially reduce the possibility of the drum cracking in use. If a drum of the usual type should crack it is practically unserviceable.

There have been proposals for incorporating inner liners of different metals in brake drums but these were intended for wear conditions and did not substantially strengthen the cast metal components on the outside or materially reduce cracking.

There have also been proposals for surrounding the brake drum with a coating or thin jacket of a metal having good heat radiating characteristics, but such constructions, so far as known, do not provide any appreciable added strength to the drums.

SYNOPSIS OF INVENTION

According to the present invention a cast iron brake drum has a reinforcing band of a metal, such as steel, of high tensile strength integrally bonded in the exterior surface of the drum by casting molten metal about and within it to strengthen the drum, inhibit cracking, and to maintain the drum in a serviceable condition if cracks in the cast metal component should develop. The band is located wholly or largely adjacent the outer end of the drum where it will be most effective for reducing end expansion or bell-mouthing. The effectiveness of the reinforcing band is increased for the amount of metal therein by providing at least one outwardly extending and preferably radial strengthening flange on the band. For greater assurance of retaining the reinforcing band, the cast component is formed with a radial flange beyond the reinforcing band toward the open end of the drum.

DRAWINGS

The objects and advantages of the invention as well as various features of novelty will be apparent from the following description of an illustrative embodiment thereof, reference being made to the accompanying drawings, wherein.

SPECIFIC EMBODIMENT

Figure 1:
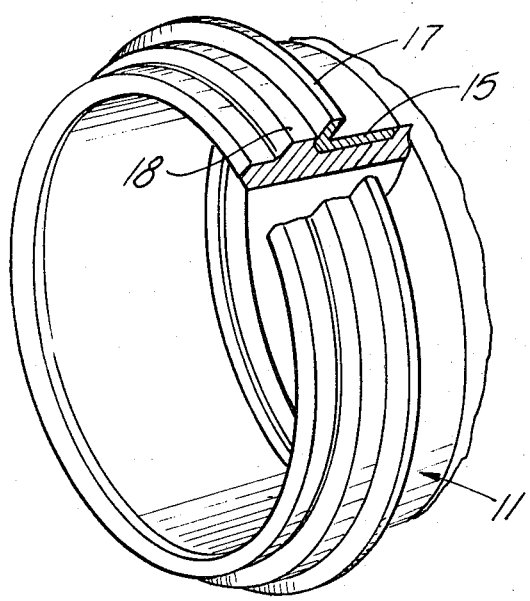
FIG. 1 is an end perspective view partly in section of a brake drum embodying the invention.
Figure 2:
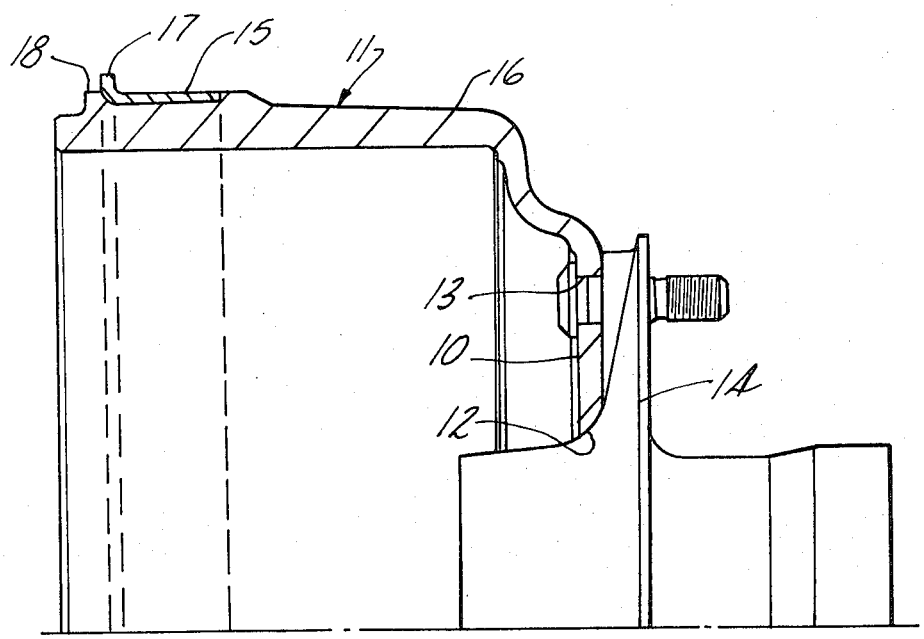
FIG. 2 is a partial axial section of the brake drum.

The brake drum shown comprises an end web 10 and an integral shell or drum proper 11, both of cast metal. The metal is usually cast iron but may be aluminum, magnesium or other metal of suitable type. The web has a hub opening 12 and stud holes 13. The drum is here shown as mounted on a wheel support 14.

A reinforcing band 15 of high-tensile metal, such as steel, is embedded in the cast metal of the shell or drum proper near the outer open end. The inner portion 16 of the drum is used for chucking during machining operations. The band 15 at its outer end is provided with an outturned flange 17 which for greater strength and the least amount of material is preferably radial with curves on each side at the bend.

In manufacture, the reinforcing band is incorporated in the matrix material of the mold, sand or the like, and the metal for the main body of the drum is cast around it to form an integral bond therewith. The cast metal has an outer flange 18 to add strength to the assembly and further assure retention of the reinforcing band. At the inner end of the band its outer surface is about even with the outer surface of the cast metal.

Satisfactory service has been obtained by using a reinforcing band of common 1010 steel which on the cast drum would be in an annealed condition.

The reinforcing band is of sufficient length and thickness to provide very material strength. For example, for a 16.5 inches I.D. brake drum having a brake surface length of about 8 inches and a thickness below the band of about ⅞ inch, the reinforcing band is about 3/16 inch or ¼ inch thick and about 2 inches long with a flange of about ½ inch height at the outer end measured from the bottom surface of the band. The outer end of the band is located about ⅞ inches from the outer end of the brake drum.

Proportionally, the band is about one-quarter of the length of the braking surface, about one-fifth of the thickness of the cast metal below it and about one-ninth of the length of the braking surface from the end. These figures are given merely as illustrative for a certain drum size to show that the band is of such substantial size and strength as to be capable of fully reinforcing the drum under operating conditions and that it is not a mere covering layer such as has been proposed for heat exchange improvement.

As an example of the effectiveness of the reinforcing band of the present invention, it has maintained a brake in serviceable condition when the cast metal component was broken through in four places circumferentially.

It is thus seen that the invention provides a very simple and inexpensive composite brake construction which greatly improves the strength and service of brakes and is also simple and inexpensive to manufacture. No material change is casting procedure is needed to incorporate the reinforcing band.

While one embodiment of the invention has been described for purposes of illustration, it is to be understood that there may be various embodiments and modifications within the general scope of the invention.

I claim:

1. A cast brake drum comprising a radially extending web having a central aperture for accommodating a wheel hub and a plurality of stud holes formed therein radially spaced about said central aperture for positioning and securing said brake drum to the wheel hub, a shell drum having one edge integrally connected to said web and extend axially therefrom and the other edge thereof forming an open end of said brake drum, said shell drum having an inner surface adaptable as a brake surface and an outer surface, and a cast-in steel reinforcing band of high-tensile strength surrounding and embedded on said outer surface of said shell drum adjacent said open end, said reinforcing band being adjacent said open edge of said drum and having an inner edge and an outer edge, a radially outwardly extending flange integrally connected to the outer edge of said band, said band of sufficient thickness and length for resisting breaking loads if the cast metal should crack, said band having an outer surface extending between said edges and being flush with the outer surface of said shell drum, and said shell drum having a radial flange between the open edge of said drum and the radially extending flange of said band.

2. A brake drum as set forth in claim 1, in which the reinforcing band width is about one-quarter of the length of the braking surface of the drum and its thickness about one-fifth of the thickness of the cast metal beneath it.

3. A brake drum as set forth in claim 1, in which the band is located at a distance of about one-ninth of the length of the braking surface from said open end of the drum.

* * * * *